US007405910B2

(12) United States Patent
Maitra et al.

(10) Patent No.: US 7,405,910 B2

(45) Date of Patent: Jul. 29, 2008

(54) MULTIFUNCTION HYBRID SOLID-STATE SWITCHGEAR

(75) Inventors: Arindam Maitra, Knoxville, TN (US); Mark McGranaghan, Knoxville, TN (US); Jih-Sheng Lai, Blacksburg, VA (US); Tom Short, Ballston Spa, NY (US); Frank Goodman, Palo Alto, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 11/606,459

(22) Filed: Nov. 30, 2006

(65) Prior Publication Data

US 2007/0121257 A1 May 31, 2007

Related U.S. Application Data

(60) Provisional application No. 60/740,788, filed on Nov. 30, 2005.

(51) Int. Cl.
*H02H 3/00* (2006.01)
*H02H 3/10* (2006.01)

(52) U.S. Cl. ........................ 361/7; 361/2; 361/6; 361/8

(58) Field of Classification Search ..................... 361/7, 361/2, 6, 8

See application file for complete search history.

(56) References Cited

U.S. PATENT DOCUMENTS

| | | | | |
|---|---|---|---|---|
| 3,603,865 | A * | 9/1971 | Liebenthal | 323/351 |
| 4,780,622 | A | 10/1988 | Woodford et al. | |
| 5,444,608 | A | 8/1995 | Jain et al. | |
| 5,875,087 | A * | 2/1999 | Spencer et al. | 361/87 |
| 5,949,662 | A | 9/1999 | Boldin et al. | |
| 6,075,684 | A | 6/2000 | Duba et al. | |
| 6,141,192 | A | 10/2000 | Garzon | |
| 6,362,540 | B1 | 3/2002 | Hill | |
| 6,433,444 | B1 * | 8/2002 | de Vries | 307/64 |
| 6,549,438 | B2 | 4/2003 | Malone | |
| 6,952,335 | B2 * | 10/2005 | Huang et al. | 361/100 |
| 6,952,922 | B2 | 10/2005 | Lee et al. | |
| 7,075,767 | B2 | 7/2006 | Gemme et al. | |
| 7,079,363 | B2 * | 7/2006 | Chung | 361/13 |
| 2002/0036430 | A1 * | 3/2002 | Welches et al. | 307/18 |
| 2005/0111245 | A1 | 5/2005 | Lai et al. | |

FOREIGN PATENT DOCUMENTS

WO WO9813847 * 4/1998

OTHER PUBLICATIONS

Analysis of Protective Relaying Requirement for Solid-State Current Limiter Applications (EPRI report 1001969, 2001).

(Continued)

*Primary Examiner*—Stephen W Jackson
*Assistant Examiner*—Zeev Kitov
(74) *Attorney, Agent, or Firm*—Curatolo Sidoti Co. LPA; Joseph G. Curatolo; Stephen J. Presutti

(57) ABSTRACT

A universal hybrid solid-state switchgear for power transmission or distribution systems incorporates a fast mechanical switch and solid-state power electronics switching circuits to provide circuit breaker and fault current limiting applications.

17 Claims, 3 Drawing Sheets

OTHER PUBLICATIONS

Solid-State Circuit Breaker Scoping Study (EPRI report 1000507, 2000).

Technical and Economic Feasibility of a Solid State Current Limiter (EPRI report 1001816, 2002).

Lab Tests of a Single-phase medium voltage solid state current limiter (EPRI report 1002114, 2003).

Field Trial Plan for a Medim Voltage, Solid State Current Limiter (EPRI report 1002116,2003).

EPRI's Program to Develop Advanced Semiconductor Materials and Process (EPRI Tech Brief 1006525, 2001).

Fault Current Limiters—Utility Needs and Perspectives (EPRI Report 1008696 & 1008694, 2004).

Damsky, B., Gelman, V., and Frederick, J., "A Solid State Current Limiter," 2003.

IEEE Working Group on Distribution Protection, "Distribution Line Protection Practices Industry Survey Results," IEEE Transactions on Power Delivery, vol. 10, No. 1, pp. 176-186, Jan. 1995.

M Takeda, T. Aritsuka, H. Yamamato, I. Kamiyama, G> Reed, "Development of a Novel Hybrid Switch Device and Applications to a Solid-State Transfer Switch," IEEE PES 1999.

M. Steurer, K. Frohlich, W> Holaus, and K. Kaltenegger, "A Novel Hybrid Current-Limiting Circuit Breaker for Medium Voltage: Principle and Test Results," IEEE Trans. PD, vol. 18, No. 2, Apr. 2003, pp. 460-467.

C. Abi Samra, et al. "Applications of the New Distribution Class Solid-State Breaker," Custom Power Conference, Dec. 1997.

* cited by examiner

MULTIFUNCTION HYBRID SOLID-STATE SWITCHGEAR

CROSS REFERENCE TO RELATED APPLICATIONS

This application claims the benefit of the filing date under 35 U.S.C. § 119(e) of U.S. Provisional Application for Patent Ser. No. 60/740,788 filed Nov. 30, 2005, which is fully incorporated herein by reference.

BACKGROUND

With the growth of the electricity demand, utilities have been upgrading their systems continuously for higher power transfer capability and consequently, for higher fault current handling capability. There are growing instances in utility distribution and transmission systems wherein the fault current levels are exceeding the interrupting capability of existing substation circuit breakers. This increase in fault current level either requires the replacement of a large number of substation breakers or the development of some means to limit the fault current. Also, many mechanical circuit breakers are operating beyond the capacity originally intended in applications such as capacitor switching. This continual use of mechanical breakers requires intensive maintenance to be performed or periodic replacement of the whole breaker. Also the process of replacing circuit breakers of adequately high fault current interruption capability can become an expensive exercise. Environmental concerns with the use of both Sulfur Hexafluoride ($SF_6$) gas and oil within mechanical breakers may pose long term problems for many utilities.

SUMMARY

A hybrid solid-state switchgear is provided for accommodating power transmission or distribution circuit breaking and fault current limiting in a power transmission or distribution system and for carrying an electric current through the switchgear wherein the power transmission distribution system is electrically connected to a source bus ($V_s$), the source bus being connected to a power source through a main circuit, wherein the hybrid solid-state switchgear comprises a mechanical switch and a solid-state switch adapted to be connected to a voltage source, wherein the solid-state switch is connected in parallel with the mechanical switch; a means for receiving information for a fault condition across the mechanical switch and the solid-state switch; wherein the solid-state switch comprises a bidirectional switch disposed in a diode bridge; and, wherein the bidirectional switch is capable of protecting against the fault condition.

DETAILED DESCRIPTION

Figure 1:
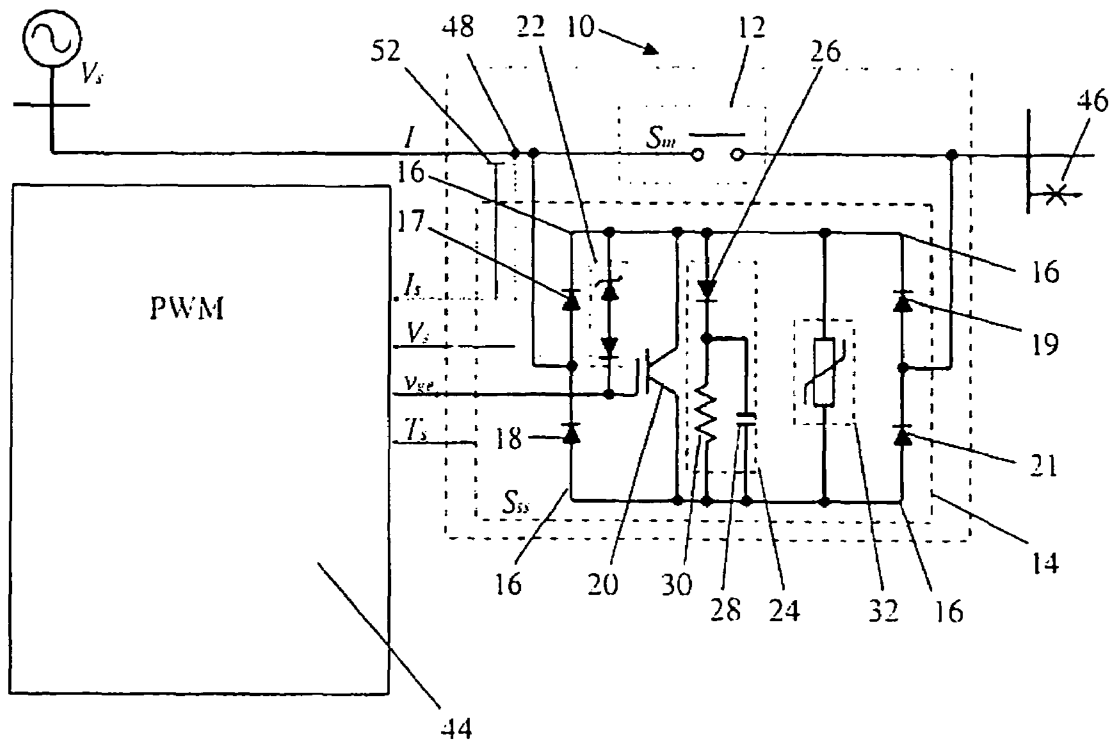
FIG. 1 shows the circuit diagram of the subject universal hybrid solid-state switchgear (UHS).

Described herein is the topology for a hybrid solid-state switchgear, a design that can perform many of the functions currently performed by a solid state circuit breaker, such as rapid fault clearing, instantaneous fault isolation, fast current limiting for downstream coordination, soft switching capabilities, rapid load transfer, and voltage and current monitoring.

This design is useful in a family of low-cost solid-state distribution switchgears that can expand the capabilities of existing distribution switchgears to a modular "integrated electrical interface" and create new service opportunities to meet customer requirements. The subject approach is a multi-functional, modular, hybrid design of power electronics based switchgear.

The hybrid solid-state switchgear design has many features that are significantly different from conventional electromechanical circuit breakers, and will have a profound impact on present practices in both transmission and distribution systems. A nonlimiting list of enhancements over a conventional mechanical breaker includes: (1) current limiting of high magnitude fault currents, (2) faster clearing, (3) reduced maintenance, (4) reduced switching surges, and (5) high-speed load transfers.

This design provides one or more improvements over the prior art. A nonlimiting list of improvements includes: sub-cycle operation: long breaker life and reduced maintenance costs: $SF_6$ is not required; lower losses: less expensive than "all solid-state" designs; cooling is not required; reduced switching transients; and current limiting capabilities.

A hybrid solid-state switchgear is provided for multi-purpose distribution class circuit breaker and fault current limiting applications. The hybrid solid-state switchgear hybrid solid-state switchgear can have various embodiments that may be referred to herein as: solid-state switchgear, solid-state feeder switchgear, hybrid solid-state distribution class switchgear, distribution solid-state switchgear, or solid state switches.

One embodiment has functionality within certain power substation applications. Two functional characteristics that can be attributed to solid-state switchgear are: current limiting and speed. Fault current limiting can allow the switchgear to be used in areas where fault current has (or will be) grown past the fault-current duty of existing circuit breakers. Fast switches and fault limiting can help reduce stress on distribution transformers and other distribution equipment. This embodiment can have an effect on custom applications to large customer services. Large customers/consumers that use switchgears could use solid-state switchgears. They may have special needs that could be met by the subject solid-state switchgear including, but not limited to, fast transfer switching, sensitive equipment protection, and optionally voltage-sag correction.

A further use is within feeder applications. One functional characteristic that can be attributed to the subject solid-state feeder switchgear is fast operation. Fault-current limiting is a characteristic that may not be needed as often (fault currents are generally lower). Solid-state feeder switchgear characteristics such as reliability and flexibility in control and operation can help gain acceptance and be advantageous in the commercial market. Competitive cost is another characteristic that can be attributed to the subject solid-state feeder switchgear.

This hybrid solid-state switchgear can be further utilized in Industrial applications. Large industrial facilities are large consumers of medium-voltage switchgear and would benefit from fault-current limiting for cases with high short-circuit levels, provided by the subject solid-state switchgear at competitive cost. Additionally, governmental agencies and private industries can apply the solid-state switchgear for use with utilities and distributed generation system(s).

This hybrid solid-state switchgear, as used for distribution class applications, is capable of rapid load transfer. Distribution solid-state switchgear can be used as solid-state transfer switches. The solid-state switchgear designs can be used to transfer the power supply of sensitive loads, from a “normal” supply system to an “alternate” supply system when a failure is detected in the “normal” supply. In one embodiment, this transfer is performed quickly (¼ cycle) so that the load does not experience any power quality problem.

Furthermore, this hybrid solid-state switchgear is capable of circuit sectionalizing and reconfiguration. Solid-state switches can eliminate momentary interruptions for the great majority of users on distribution systems when a fault occurs. Solid-state switches for reconfiguring systems can also allow for optimizing performance through reconfiguration without imposing momentary interruptions on users.

Also, the hybrid solid-state switchgear is capable of rapid fault current solution deployment. Solid-state switchgear designs can enable transmission and distribution entities/users to effectively deal with pressures to add new transmission capacity, provide open access for distributed and aggregate generation, and deal with the challenges presented by new fault current sources. Fault-current limiting is a characteristic that can be attributed to the subject solid-state switchgear.

The following benefits can result from using solid-state switchgear that has fault-current limiting characteristics. First, cable thermal failures are less likely, and violent equipment failures are less likely.

Furthermore, this hybrid solid-state switchgear alleviates conductor burndowns. At the fault, the heat from the fault current are may burn the conductor enough to break it, dropping it to the ground. Solid-state switchgear can provide faster clearing and lower magnitudes, therefore reducing the chance of burndowns. Additionally this hybrid solid-state switchgear can prevent damage of inline equipment. A known problem is with inline hot-line clamps. If the connection is not good, high-current fault arcs across the contacts can burn the connection apart. Solid-state switchgear can provide faster clearing and lower magnitudes, therefore reducing the chances of such damage.

This hybrid solid-state switchgear can also prevent evolving faults. Ground faults are more likely to become two- or three-phase faults with longer, higher-magnitude faults. Solid-state switchgear can provide current-limiting that may reduce this probability. Also, faults on underbuilt distribution are less likely to cause faults on the transmission circuit above due to rising arc gases with fault-current limiting.

In addition, some distribution stations have fault current levels near the maximum ratings of existing switchgear; additional short-circuit current requires reconfigurations or new technology. Solid-state switchgear can provide fault-current limiting that can resolve this problem. Step and touch potentials are less severe during faults. Thus, the hybrid solid-state switchgear can limit the severity of electrical shock.

Moreover, conductor movement is also an issue. Conductors move less during faults, providing more safety for workers in the vicinity of the line and making conductor slapping faults less likely.

Also of interest is the fact that solid-state switchgear with fault-current limiting characteristics can reduce the depth of the voltage sag to customers/users on adjacent circuits. Solid-state switchgear with fault-current limiting characteristics allow fuse coordination to be easier. Thus, fuse saving is more likely to work with lower fault currents.

With the flexibility of power electronic switching, the hybrid solid-state switchgear will achieve fault isolation and provide better network protection, and take care of most of the distribution system situations that result in voltage sags, swells, and power outages.

This hybrid solid-state switchgear design can provide instantaneous (sub-cycle) current limiting. Furthermore, this solid-state switchgear can alleviate the short circuit condition in both downstream and upstream devices by limiting fault currents coming from the sources of high short circuit capacity.

The hybrid solid-state switch also allows for faster fault clearing as well as shortening the recloser interval. Solid-state sitchgear designs may allow utilities/users to clear faults more quickly than current circuit breakers.

New technology will increase the available fault current of the network and may result in existing equipment not being adequately rated to handle the new ratings. Upgrading the system to accommodate the new fault current ratings may be expensive and create excessively high prices and barriers to new generation. This hybrid solid-state switchgear design with current limiting capabilities can be used to mitigate the above mentioned situations.

It is well known in the art that high fault currents are known to be a factor in reducing transformer life, so any advantage that can result from using solid-state switchgear results in longer life with higher reliability for nearby transformers.

It should also be noted that equipment in the fault current path will not experience the high asymmetrical and symmetrical fault currents that would be possible without the solid state switchgear. Using the disclosed hybrid solid-state switchgear can limit the inrush current for capacitive loads: rather than making an abrupt transition from an open to a closed position, the hybrid solid-state switchgear gradually phases in the switching device.

Hybrid solid-state switchgear can prevent transient voltages during capacitor switching and will allow capacitors to be switched in and out as often as needed. The result is better control or volt-amperes reactive (VAR) flows, voltage, and flicker on the distribution system without causing unacceptable transient voltages.

Using hybrid solid-state switchgear can implement “standardized” designs and provide an alternative to large scale power system breaker upgrades. There are fixed and variable costs in maintaining an inventory of distribution switchgears. One of the possible characteristics for the solid-state switchgear design is standardization of product classes compared to the existing practice based on multiple voltages and current rating. Realization of this primary functional specification can result in significant reduction in inventory cost. It is possible to significantly reduce inventory costs by introducing “standardized” switchgear designs.

Another aspect of this hybrid solid-state switchgear is that it avoids using, traditional (series reactor) fault current limiting solutions. The operations-and-maintenance (O&M) cost reductions are potentially achievable with hybrid solid-state switchgears through significant reduction of size and weight and improved communication capabilities. In certain embodiments, the hybrid solid-state switchgear adopts the IEC 61850 communication architecture.

By minimizing the need for SF6 breakers, the hybrid solid-state switchgear designs will help diminish the environmental impacts of greenhouse gas and arced oil associated with breakers.

Solid-state switchgear can provide advanced distribution automation that can help develop new applications for condition monitoring and asset management purposes. Other advanced distribution automation functions are listed below.

In one embodiment, the hybrid solid-state switchgear can act as a sensor of voltage, current, and power factor, and can perform other advanced distribution automation functions. Solid-state switchgear can be automated to record and transfer vital power quality and reliability information, as discussed below.

Solid-state switchgear are capable of providing real-time information about any combination of the following: voltage magnitude, current magnitude, power quality characteristics of the voltage and current, real and reactive power, temperature, energy use, harmonic distortion, and power factor.

Solid-state switchgear can provide alarming functions with intelligence for processing data and identifying conditions that require notification of a utility or utility automation system. These conditions could include any combination of the following: outages, power quality conditions outside of specified thresholds, excessive energy use, conditions characteristic of equipment problems, incipient fault detection, equipment problem identification, fault location, performance monitoring of protective systems, and harmonic resonance conditions.

Solid-state switchgear can provide real-time state estimation and predictive systems (including fault simulation modeling) to continuously assess the overall state of the distribution system and predict future conditions. Solid-state switchgear can therefore provide the basis for system optimization.

Solid-state switchgear can provide or assist information systems that can integrate meter data with overall information systems for optimizing system performance and responding to problems. These problems can include, but are not limited to: outage management, asset management, supervisory control and data acquisition (SCADA) systems, loss analysis, and customer systems.

Solid-state switchgear can integrate communications and control functions in order to optimize system performance. Solid-state switchgear can provide an open, standardized communication architecture that is needed to achieve the requisite central and local control by which the flexible electrical system described above can be strategically operated using predetermined algorithms.

In a further embodiment the hybrid solid-state switchgear conforms to IEC 61850 and is remotely accessible via a communication system for remote control and uses, or is used as, a distribution system condition monitoring node. IEC 61850 is the international standard document for substation automation systems developed under IEC Technical Committee (TC) 57. It defines the standards for communication architecture in the substation and the related system requirements. It supports all substation automation functions and their engineering. Different from that of earlier standards, the technical approach makes IEC 61850 flexible and future-proof. Additional parts of 61850 are currently under development by working groups of TC-57 to address standards for communications in the balance of the distribution system (feeder equipment).

SPECIFIC EMBODIMENTS

A hybrid solid-state switchgear is provided that is useful in multi-purpose circuit breaker and fault current limiting applications. Although the requirements for fault clearing, recloser, transfer switch, and current limiting are different, an issue that presents itself is to turn the device off without going through zero crossing. Thus a design criterion for a universally used hybrid solid-state switchgear is to be able to interrupt the current at any time. In this application, the gate controlled device is useful to address cost and reliability concerns, an embodiment provides that the circuit avoids using excessive bulky passive components. In this embodiment, the pure SCR (Silicon Controlled Rectifiers) based switch is excluded. Even though SCR can be force-turned off by external commutation circuits for fault current limiting, the added components can be excluded. Gate-controlled switches typically have a high voltage drop that significantly degrades their efficiency. The solid-state switch is a hybrid version that uses a fast mechanical switch for regular conducting and a gate-controlled switch for fault clearing and current limiting. In certain embodiments, the hybrid solid-state switchgear has a rating of at least 1200 Amps.

Operating Under Normal Steady-State Conduction Mode

FIG. 1 shows the circuit diagram of one embodiment for a universal hybrid solid-state switchgear (UHS) 10 operating under normal conditions. The UHS 10 is comprised of a fast mechanical switch ($S_m$) 12 and a solid-state switch ($S_{ss}$) 14. The UHS may be connected to a voltage source $V_5$, which supplies voltage across the fast mechanical switch 12 and solid-state switch 14, where the solid-state switch 14 is parallel to the fast mechanical switch. A fast-action mechanical switch 12 is turned on in steady state to bypass the current I and to avoid overheating the solid-state switch 14, which tends to have higher loss and higher associated heat generation. A steady state response is the electrical response of a system at equilibrium. The steady state response does not necessarily mean the response is a fixed value. An AC power supply has no fixed voltage on the output but the output is steady (a voltage of a fixed frequency and voltage). In electronics, a steady state occurs in a circuit or network when all transients have died away. It is an equilibrium condition that occurs as the effects of transients are no longer important.

The solid-state switch 14 is made up of several circuits and components. First, a diode bridge (FIG. 1 depicting the four corners of the diode bridge) 16, made up of diodes 17, 18, 19 and 21, provides limiting where voltage is applied. A diode bridge 16, or bridge rectifier (occasionally called a Graetz bridge) is an arrangement of at least four diodes connected in a bridge circuit that provides the same polarity of output voltage for any polarity of the input voltage. When used in its most common application, for conversion of alternating current (AC) input into direct current (DC) output, it is known as a bridge rectifier. The bridge rectifier provides full wave rectification from a two wire AC input (saving the cost of a center tapped transformer) but has two diode drops rather than one, reducing efficiency over a center tap based design for the same output voltage.

During operation of the solid-state switch 14, the diode bridge 16 prevents current from traveling in unintended directions. When the voltage source $V_s$ is connected at the left side of the switch between diode 17 and diode 18, diode 17 is positive with respect to the diode 21, current flows to the right through diode 17 and through the snubber circuit 24, through diode 21, and returns to the input supply.

In each case, the upper right output remains positive with respect to the lower right one. Since this is true whether the input is AC or DC, this circuit not only produces DC power when supplied with AC power, it also can provide what is sometimes called "reverse polarity protection". That is, it permits normal functioning when batteries are installed backwards or DC input-power supply wiring "has its wires crossed" (and protects the circuitry it powers against damage that might occur without this circuit in place).

Across the diode bridge 16 may be an integrated gate bipolar transistor (IGBT) 20, wherein the gate of the IGBT 20 is connected to a transient voltage-suppressor (TVS) 22, where the opposing end of the TVS 22 is connected to the diode bridge 16. Generally, integrated gate bipolar transistors are power electronic devices which provide a desired electrical current with the help of integrated control elements.

Additionally, with respect to TVS 22, a transient voltage-suppressor may be a zener diode that is engineered for high power operation. A TVS is generally used to control and limit the voltage developed across any two, or more, terminals. The TVS accomplishes this task by clamping the voltage level and diverting transient currents from sensitive circuitry when a trigger voltage is reached.

TVS devices lend to have response times in inverse proportion to their current handling capability. As a result, two devices (one with slow response and high current capability and one with fast response but low current capability) may be used to achieve the desired protection level.

TVS devices can be utilized to suppress transients on the AC mains, DC mains, and other power supply systems. They can also be used to clamp transient voltages generated by the switching of inductive loads within an application. Furthermore, TVS devices are available as unipolar or bipolar (that is, it can suppress transients in one direction or in both directions).

The TVS device can be represented by two mutually opposing zener diodes in series with one another, connected in parallel with the circuit to be protected. While this representation is schematically accurate, physically the devices are now manufactured as a single component. The device operates by shunting excess current when the induced voltage exceeds the zener breakdown potential.

Redirecting attention to FIG. 1, in parallel with the IGBT 20 and across the diode bridge 16 is a snubber circuit 24, which can be made up of a blocking diode 26, a capacitor 28 and a resistor 30. A snubber is a simple electrical circuit used to suppress ("snub") electrical transients. Snubbing is accomplished by selectively storing energy in a capacitor during one portion of an operating cycle and discharging the energy during a second portion of the cycle. Snubbers are frequently used with an inductive load where the sudden interruption of current flow would lead to a sharp rise in voltage across the device creating the interruption. This sharp rise in voltage might lead to a transient or permanent failure of the controlling device.

Frequently, a snubber may consist of just a small resistor (R) in series with a small capacitor (C). This combination can be used to suppress the rapid rise in voltage across a thyristor, preventing the erroneous turn-on of the thyristorp; it does this by limiting the rate of rise in voltage (dv/dt) across thyristor to a value which will not trigger it. Snubbers are also often used to prevent arcing across the contacts of relays (and the subsequent welding/sticking of the contacts that can occur). An appropriately-designed RC snubber can be used with either direct current (DC) or alternating current (AC) loads.

When DC current is flowing, another often seen form of a snubber is a simple rectifier diode placed in a circuit in parallel with an inductive load (such as a relay coil or electric motor). The diode is installed in the direction that ordinarily does not allow it to conduct. When current to the inductive load is rapidly interrupted, a large voltage spike would be produced in the reverse direction (as the inductor attempts to keep current flowing in the circuit). This spike is known as an "inductive kick". Placing the snubber diode in inverse parallel with the inductive load allows the current from the inductor to flow through the diode rather than through the switching element, dissipating the energy stored in the inductive load in the series resistance of the inductor and the (usually much smaller) resistance of the diode (over-voltage protection).

Returning to FIG. 1, in parallel and within the diode bridge 16 made up of diodes 17, 18, 19, and 21, may be a metal-oxide-varistor (MOV) 32. The metal-oxide-varistor (or voltage-variable resistor) is a non-linear, symmetrical, bipolar device that dissipates energy into a solid, bulk material such as a metal oxide in the case of the current embodiment, the metal-oxide-varistor 32. As a result, the varistor will effectively clamp both positive and negative high current transients. Generally, a MOV may contain a ceramic mass of zinc oxide grains, in a matrix of other metal oxides (such as small amounts of bismuth, cobalt, manganese), sandwiched between two metal plates (the electrodes). The boundary between each grain and its neighbor forms a diode junction, which allows current to flow in only one direction. The mass of randomly oriented grains is electrically equivalent to a network of back-to-back diode pairs, each pair in parallel with many other pairs. When a small or moderate voltage is applied across the electrodes, only a tiny current flows, caused by reverse leakage through the diode junctions.

Important parameters for varistors are response time (how long it takes the varistor to break down), maximum current and a well-defined breakdown voltage. When varistors are used to protect communications lines (such as phone lines used for modems), their capacitance is also important because high capacitance would absorb high-frequency signals, thereby reducing the available bandwidth of the line being protected.

Figure 1A:
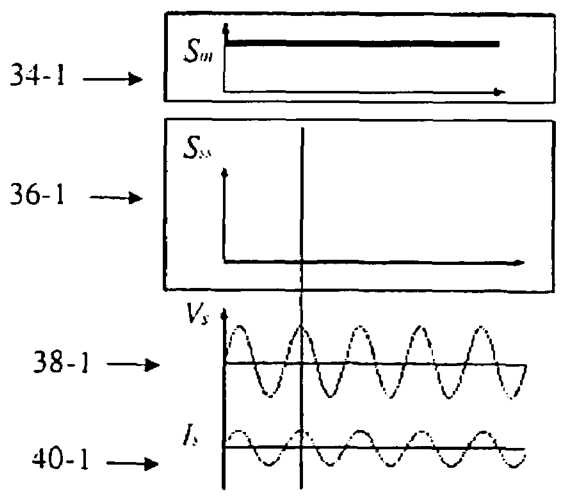
FIG. 1A shows the basic operational waveforms of the UHS at steady-state conduction.

FIG. 1A graphically shows the UHS operational waveforms operating free of any fault conditions. Waveform $S_m$ 34-1 depicts the operation of the fast mechanical switch 12, where it is functioning properly. Accordingly, during that time, the solid-state switch 14, indicated by waveform $S_{ss}$ 36-1 is inactive, waveform $I_5$ 38-1 depicting current at sensing point 52 and waveform $V_s$ 40-1 both operate within the normal ranges.

Operating Under Fault Limiting Conditions

Figure 2:
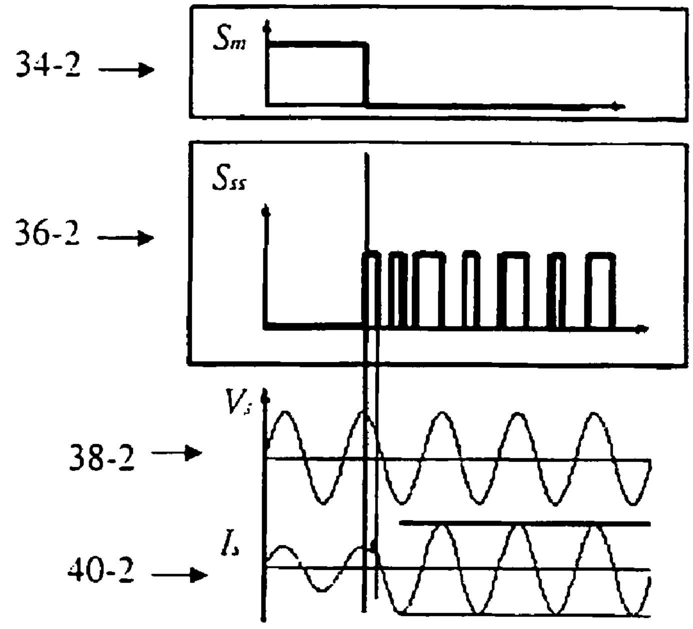
FIG. 2 shows the UHS operational waveforms under fault current limiting condition.

FIG. 2 shows the operating waveforms for the UHS 10 working under a fault current limiting condition. When a fault current is detected (as depicted graphically by waveform $I_s$ 38-2), the mechanical switch 12 can be quickly turned off. The current can then be transferred to the solid-state switch 14 for fault current limiting and clearing operations.

The solid-state switch 14 works in transient fault condition and may be controlled with pulse-width modulation to limit the fault current. The fast mechanical switch 12 may work only in steady state to allow low-loss operation and to avoid an unreliable and bulky thermal management system.

Waveform $S_m$ 34-2 depicts the operation of the fast mechanical switch 12. When the fault current is detected, depicted graphically by the inconsistency within waveform $I_s$ 40-2, the fast mechanical switch instantly ceases operation. As a result, waveform $S_{ss}$ 36-2 begins operation of a step function pulse width modulation which operates the solid-state switch 14. The waveform $V_s$ 38-2 depicts the voltage coming from the voltage source $V_s$ across the fast mechanical switch 12 and across the solid-state switch 14.

As stated previously, the solid-state switch 14 may comprise a diode bridge 16 made up of diodes 17, 18, 19, and 21, wherein a pulse width modulator (PWM) controlled integrated gate bipolar transistor (IGBT) 20 or another gate-turn-off (GTO) device operate as a bidirectional switch for operating under fault limiting conditions.

Pulse Width Modulator (PWM) is the present state of the art method used to control frequency and voltage. It is a modulation technique that generates variable-width pulses to represent the amplitude of an analog input signal. In application, an AC power source is connected to the drive rectifier, converted to DC, and then "inverted" in a logic controlled output of DC pulses of varying width (voltage) and polarity (frequency). Furthermore, the digital nature (fully on or off) of the PWM circuit is less costly to fabricate than an analog circuit that does not drift over time.

When the fault 46 occurs beyond the UHS (as depicted in FIG. 1), the mechanical switch 12 is turned off, and solid-state switch 14 is turned on to allow current I to flow through the IGBT 20 and PWM 44. This fault current magnitude can be controlled by the PWM switching, depicted graphically in waveform $S_{ss}$ 36-2. As is shown the waveform $S_{ss}$ 36-2, the solid-state switch 12 modulates while operating under the fault current limiting conditions.

The PWM 44 may have current and voltage sensors, $I_s$ and $V_s$, that can also serve a monitoring purpose. A temperature sensor $T_s$ may also be fed back to the controller for device protection. The gate-drive circuit may have a transient-voltage suppressor (TVS) 22 to allow gate triggered under over-voltage condition to protect the device from instantaneous over-voltage failure. Then a fault current occurs, it will occur beyond the UHS 10, and depicted in FIG. 1 as fault 46, a metal-oxide-varistor (MOV) 32 may absorb transient over-voltage coming from the system. When the switch is operating in PWM condition (depicted graphically by waveform $S_{ss}$ 36-2, a snubber circuit 24 may serve as the energy buffer that allows current magnitude to be regulated.

Operating under Fault Clearing Mode

Figure 3:
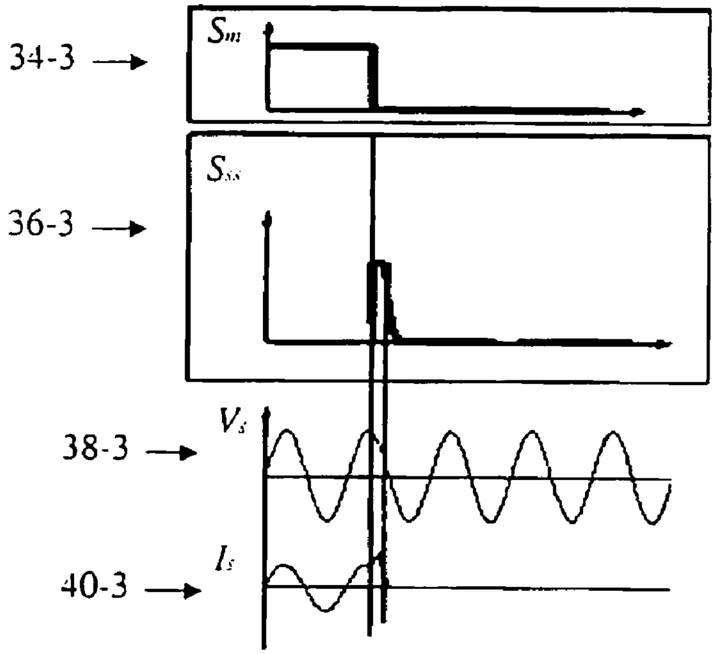
FIG. 3 shows the UHS the operational waveforms associated with fault clearing mode operation.

The fault clearing mode can be controlled by simply turning off the switch without PWM operation. FIG. 3 shows the UHS associated waveforms under fault clearing mode operation. When the fault occurs, the mechanical switch 12 turns off, and the solid-state switch 14 turns on to avoid the voltage arc. Once the current is flowing in solid-state switch 14, it can be turned off at any time to clear the current fault. If the solid-state switch 14 is turned off, the switch may be discharged by the MOV 32. As shown in FIG. 3, waveform $S_{ss}$ 36-3 operates a single pulse width modulation and then no longer operates. The waveform $I_s$ 40-3 depicts the current no longer flowing through the UHS 10. Voltage is still being applied at the sensing point 48; however, neither the mechanical switch 12 nor the solid-state switch 14 is operating, so no current is being conducted. Thus, the powering down allows the clearing of the current fault. Similar operating procedures can also be applied to static transfer switch operation. In that case, two hybrid solid-state switchgear are used.

Operating under Linear Region

Figure 4:
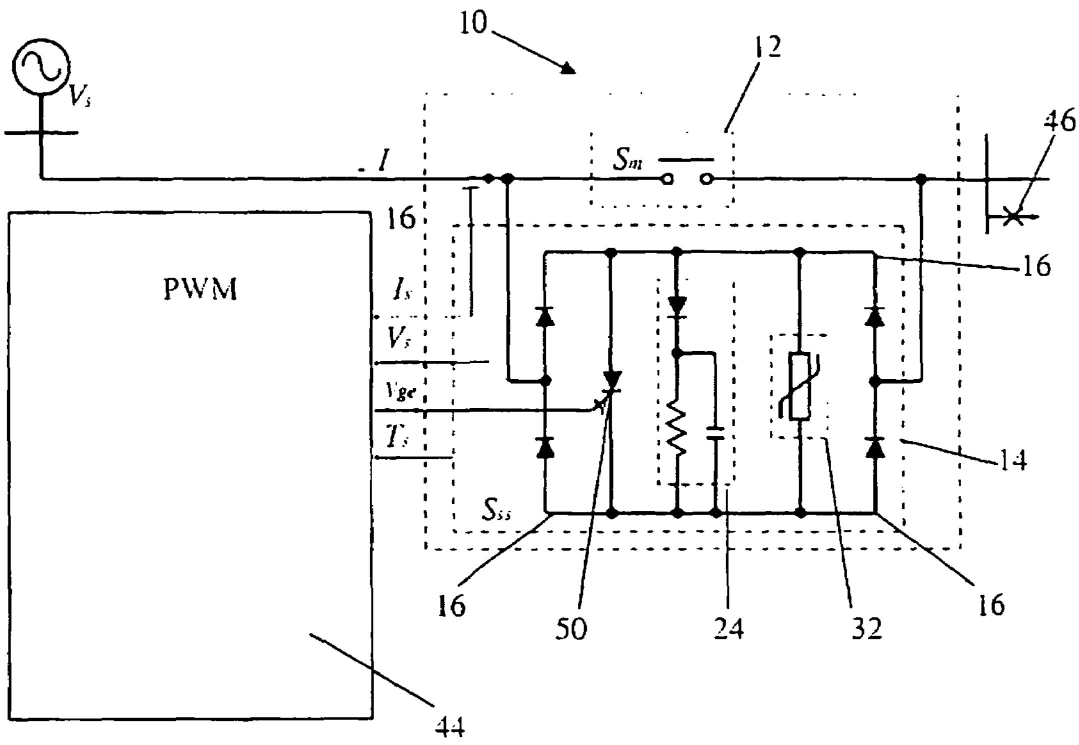
FIG. 4 shows the UHS circuit diagram using gate-turn-off (GTO) or GTO-derived devices for current limiting operation.

In FIG. 4, the fault current limiting mode can also be controlled by operating the device in the linear region without PWN operation. The operation is simply to reduce the gate drive voltage so that the device goes into high impedance mode. In this embodiment, a large amount of power needs to be consumed in the device, and the temperature can rise very quickly. Thus, this mode of operation may not be useful for a long-term current limiting condition. The temperature feedback would be useful to ensure device junction temperature stays below the desired operating limit.

The linear region operation cannot be achieved with all thyristor devices because they are latch-on devices. However, the gate-turn-off (GTO) thyristor 50 and GTO-derived devices (for example, emitter-turn-off (ETO) and super-gate-turn-off (super-GTO)) can be used in PWM operation with a lower switching frequency that that is required when using an integrated gate bipolar transistor. Additional embodiments can also operate using an integrated gate communicated thyristor, or any combination of the components mentioned above.

Figure 4A:
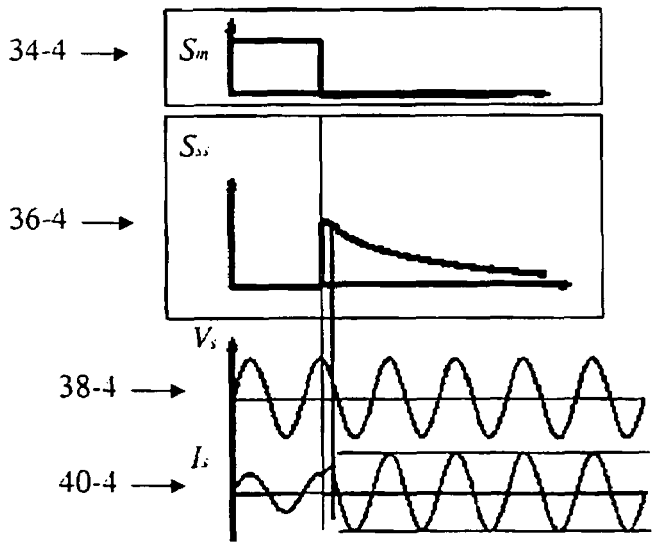
FIG. 4A shows the UHS pulse width modulation (PWM) waveforms using gate-turn-off (GTO) or GTO-derived devices for linear mode current limiting operation.

FIG. 4 shows the circuit diagram and FIG. 4A shows the associated PWM waveforms using GTO thyristors or GTO-derived devices for current limiting operation. The use of the GTO thyristor 50 does not have over-voltage protection function provided by the IGBT 20, but the same function can be performed with MOV 32. The snubber 24 may be used for the energy buffer as well as protection against any rapid change in voltage over short periods of time (dv/dt). The current snubber function may be obtained by the line inductance.

The GTO thyristor 50 may be a solid-state semiconductor device with four layers of alternating N and P-type material. Generally, GTO thyristors act as a switch, conducting when their gate receives a current pulse, and continue to conduct for as long as they are forward biased.

As noted above, the PWM operation can be performed by gate-turn-off devices; additionally, the same function could be performed by emitter-turn-off devices, integrated gate bipolar transistors, integrated gate bipolar transistors, integrated gate communicated thyristors, or any combination thereof.

FIG. 4A shows the waveforms associated with linear mode current limiting operation. When a fault is detected, waveform $S_m$ 34-4 no longer operates. Waveform $I_s$ 40-4 continues to conduct current and waveform $V_s$ 38-4, is still supplying voltage. However, this embodiment differs from the above embodiment due to the waveform $S_{ss}$ 36-4 no longer performing a PWM step function. Rather, waveform $S_{ss}$ 36-4 goes to zero exponentially, causing heat within the UHS 10 to build up quickly.

Although the hybrid solid-state switchgear has been described in detail through the above detailed description and the preceding examples, these examples are for the purpose of illustration only and it is understood that variations and modifications can be made by one skilled in the art without departing from the spirit and the scope of the invention. It should be understood that the embodiments described above are not only in the alternative, but can be combined.

What is claimed is:

1. A hybrid solid-state switchgear for accommodating power transmission or distribution, circuit breaking or fault current limiting in a power transmission or distribution system, and for carrying an electric current through the switchgear, wherein the power transmission or distribution system is electrically connected to a source bus, the source bus being connected to a power source through the hybrid solid-state switchgear comprising:

a mechanical switch and a solid-state switch adapted to be connected to a voltage source, wherein the solid-state switch is connected in parallel with the mechanical switch;

a means for receiving information for monitoring for a fault current condition across the mechanical switch and the solid-state switch;

wherein the solid-state switch includes a diode bridge having a bidirectional switch disposed therein;

wherein the bidirectional switch is capable of protecting against the fault current condition; and, wherein upon detecting a fault current, the current is transferred to the solid-state switch for fault current limiting operations, wherein the solid-state switch is controlled by pulse width modulation.

2. The hybrid solid-state switchgear of claim 1, wherein the bidirectional switch comprises a pulse width modulator capable of controlling an integrated gate bipolar transistor.

3. The hybrid solid-state switchgear of claim 1, wherein the bidirectional switch comprises a pulse width modulator combined with and controlling at least one of a gate-turn-off device, emitter-turn-off device, insulated gate bipolar transistor, integrated gate bipolar transistor, integrated gate communicated thyristor, or any combination thereof.

4. The hybrid solid-state switchgear of claim 1, wherein the mechanical switch is adapted to operate during steady-state current with the current bypassing the solid-state switch.

5. A hybrid solid-state switchgear for accommodating power transmission or distribution, circuit breaking or fault current limiting in a power transmission or distribution system, and for carrying an electric current through the switchgear, wherein the power transmission or distribution system is electrically connected to a source bus, the source bus being connected to a power source through the hybrid solid-state switchgear comprising:

a mechanical switch and a solid-state switch adapted to be connected to a voltage source, wherein the solid-state switch is connected in parallel with the mechanical switch;

a means for receiving information for monitoring for a fault current condition across the mechanical switch and the solid-state switch;

wherein the solid-state switch includes a diode bridge having a bidirectional switch disposed therein;

wherein the bidirectional switch is capable of protecting against the fault current condition; and, wherein when the switchgear is operating during a fault current condition, fault current magnitude is controlled by pulse width modulation switching, the switchgear further comprising a snubber circuit to regulate the fault current magnitude, a transient-voltage suppressor to allow a gate triggered over-voltage condition, and a varistor to absorb transient over-voltage.

6. The hybrid solid-state switchgear of claim 1, wherein when the switchgear is operating during a fault current condition, the fault current condition can be cleared by ceasing operation of the solid-state switch.

7. The hybrid solid-state switchgear of claim 1, adapted to perform static transfer switch operation by operating in concert with a second said hybrid solid-state switchgear circuit.

8. The hybrid solid-state switchgear of claim 1, wherein the solid-state switch comprises a GTO or GTO-derived device disposed within a diode bridge for current limiting operation when the solid state switch is operating during a fault current condition.

9. A hybrid solid-state switchgear for accommodating power transmission or distribution, circuit breaking or fault current limiting in a power transmission or distribution system, and for carrying an electric current through the switchgear, wherein the power transmission or distribution system is electrically connected to a source bus, the source bus being connected to a power source through the hybrid solid-state switchgear comprising:

a mechanical switch and a solid-state switch adapted to be connected to a voltage source, wherein the solid-state switch is connected in parallel with the mechanical switch;

a means for receiving information for monitoring for a fault current condition across the mechanical switch and the solid-state switch;

wherein the solid-state switch includes a diode bridge having a bidirectional switch disposed therein;

wherein the bidirectional switch is capable of protecting against the fault current condition; and, wherein when a fault condition is detected, the mechanical switch can stop operation and the solid-state switch can begin operation, and wherein the means for receiving monitoring information comprises a current sensor for monitoring a fault current condition being coupled with a pulse width modulator control; further comprising:

a first voltage sensor coupled with the pulse width modulator control for maintaining a constant voltage level;

a second voltage sensor for monitoring the voltage across a gate of a gate-turn-off thyristor;

a temperature sensor coupled with the solid-state switch for monitoring operating temperatures of the solid-state switch;

the pulse width modulator controlling the gate-turn-off thyristor, the pulse width modulator controlled gate-turn-off thyristor being connected to the first voltage sensor, the second voltage sensor, the current sensor and the temperature sensor; and, a varistor connected in parallel with the gate-turn-off thyristor capable of absorbing transient over-voltage, wherein the gate-turn-off thyristor is adapted to reduce gate drive voltage across the solid-state switch, inducing the hybrid solid-state switchgear into high impedance mode.

10. The hybrid solid-state switchgear of claim 9, further comprising a snubber circuit capable of controlling fault current magnitude when the gate-turn-off thyristor is operating within a pulse width modulation condition; optionally, wherein the snubber circuit comprises at least one of a resistor, capacitor, inductor, or diode.

11. The hybrid solid-state switchgear of claim 5, wherein when the fault current condition is detected, the mechanical switch can stop operation and the solid-state switch can begin operation, and wherein the means for receiving monitoring information comprises a current sensor for monitoring a fault current condition being coupled with a pulse width modulator control; further comprising:

a first voltage sensor coupled with the pulse width modulator control for maintaining a constant voltage level;

a second voltage sensor for monitoring the voltage across the gate of an integrated gate bipolar transistor; and optionally, a temperature sensor coupled with the solid-state switch for monitoring operating temperatures of the solid-state switch;

wherein the bidirectional switch is adapted to allow current to how through the solid-state switch until the fault current condition is cleared.

12. The hybrid solid-state switchgear of claim 11, further comprising a snubber circuit capable of controlling fault current magnitude when the integrated gate bipolar transistor is operating within a pulse width modulation condition; optionally, wherein the snubber circuit comprises at least one of a resistor, capacitor, inductor, or diode.

13. The hybrid solid-state switchgear of claim 5, wherein when a fault current condition is detected, the mechanical switch can stop operation and the solid-state switch can begin operation, and wherein the means for receiving monitoring information comprises a current sensor for monitoring a fault current condition optionally being coupled with a pulse width modulator control; further comprising:

a first voltage sensor coupled with the pulse width modulator control for maintaining a constant voltage level;

a second voltage sensor for monitoring the voltage across a gate of an integrated gate bipolar transistor; and optionally, a temperature sensor coupled with the solid-state switch for monitoring operating temperatures of the solid-state switch;

wherein the fault current condition can be cleared by powering the switchgear off.

14. The hybrid solid-state switchgear of claim 13, further comprising a snubber circuit capable of controlling fault current magnitude when the integrated gate bipolar transistor is operating within a pulse width modulation condition; optionally, wherein the snubber circuit comprises at least one of a resistor, capacitor, inductor, or diode.

15. The hybrid solid-state switchgear of claim 5, wherein when a fault condition is detected, the mechanical switch can stop operation and the solid-state switch can begin operation, and wherein the means for receiving monitoring information comprises a current sensor for monitoring a fault condition optionally being coupled with a pulse width modulator control; further comprising:

a first voltage sensor coupled with the pulse width modulator control for maintaining a constant voltage level;

a second voltage sensor for monitoring the voltage across a gate of an integrated gate bipolar transistor; and optionally, a temperature sensor coupled with the solid-state switch for monitoring operating temperatures of the solid-state switch;

wherein the mechanical switch will continue to function until the fault current condition is detected.

16. The hybrid solid-state switchgear of claim 15, further comprising a snubber circuit capable of controlling fault current magnitude when the integrated gate bipolar transistor is operating within a pulse width modulation condition; optionally, wherein the snubber circuit comprises at least one of a resistor, capacitor, inductor, or diode.

17. The hybrid solid-state switchgear of claim 1, adapted for distribution system condition monitoring node uses, further adapted for remote access.

* * * * *